United States Patent [19]

Cuno

[11] 4,176,305

[45] Nov. 27, 1979

[54] GALVANO MAGNETIC POSITION CONTROL SYSTEM

[75] Inventor: Hans-Hellmuth Cuno, Waldetzenberg, Fed. Rep. of Germany

[73] Assignee: Siemens Aktiengesellschaft, Berlin & Munich, Fed. Rep. of Germany

[21] Appl. No.: 855,899

[22] Filed: Nov. 30, 1977

[30] Foreign Application Priority Data

Dec. 23, 1976 [DE] Fed. Rep. of Germany ...... P2658528

[51] Int. Cl.[2] ............................................... G05B 1/06

[52] U.S. Cl. ................................... 318/653; 179/1 F; 323/94 H; 338/32 R

[58] Field of Search ................ 318/653; 324/207, 208; 338/32 R; 179/1 F; 323/94 H

[56] References Cited

U.S. PATENT DOCUMENTS

| | | | |
|---|---|---|---|
| 2,194,175 | 3/1940 | Wilhelm | 179/1 F |
| 3,109,985 | 11/1963 | Kallmann | 338/32 R X |
| 3,334,184 | 8/1967 | DeKoning | 179/1 F |
| 3,408,575 | 10/1968 | Petrocelli et al. | 179/1 F X |

FOREIGN PATENT DOCUMENTS

| | | | |
|---|---|---|---|
| 2319934 | 2/1977 | France | 179/1 F |

*Primary Examiner*—B. Dobeck

[57] ABSTRACT

A magneto resistor whose resistance is a function of its position with respect to an external magnetic field is disclosed as a source of position feedback information which may be utilized in a closed loop system for accurately positioning a loud speaker or other coil with respect to said external magnetic field.

3 Claims, 6 Drawing Figures

GALVANO MAGNETIC POSITION CONTROL SYSTEM

BACKGROUND AND BRIEF DESCRIPTION OF THE PREFERRED EMBODIMENT

The invention relates to a device for providing position galvano magnetic feedback for electrodynamic drives having a drive coil in an air gap penetrated by the magnetic field.

It is known that in electrodynamic drives the force which is exerted onto a coil in a ring-shaped air gap penetrated by the magnetic field may be utilized to position that coil. Such drives are primarily employed in loud speakers. Additional utilization possibilities exist in signal drives when the moved masses have very small dimensions.

For the control of electrodynamic drives it is of importance that the momentary position of the drive coil can be determined as precisely as possible.

This objective is achieved in the preferred embodiment by use of at least one magneto resistor in the air gap, whose control field is the magnetic field.

A practical circuit requires providing one magneto resistor whose resistance value is advantageously determined by a fixed current source.

An alternate circuit involves using two magneto resistors in a potentiometer connection, whose output voltage is evaluated.

Finally, it is also advantageous to couple the coil and magneto resistor(s) together into a position feedback system so that the movement of the drive can be closely controlled.

By the utilization of at least one magneto resistor, a precisely operating galvano magnetic position revertive communication for electrodynamic drives is facilitated such that no large additional expense is required.

SUMMARY OF THE INVENTION

It is therefore the objective of the invention to provide the simplest possible device for the galvano magnetic position revertive communication for electrodynamic drives with the aid of which the momentary position of the drive coil can be exactly determined at any arbitrary time.

It is a further objective of this invention to incorporate a magneto resistance element as the feedback element in a closed loop positioning system which can then be used to accurately position the drive coil.

The invention comprises resistive means positioned in a magnetic field such that said resistive means is mechanically coupled to a coil whose position within said magnetic field is to be controlled; said resistive means exhibiting a resistance value based upon its position (hence also the position of aforementioned coil) in the magnetic field and used as the feedback element of a closed loop position system operable to position the coil based on an input signal.

DESCRIPTION OF PREFERRED EMBODIMENTS

Figure 1:
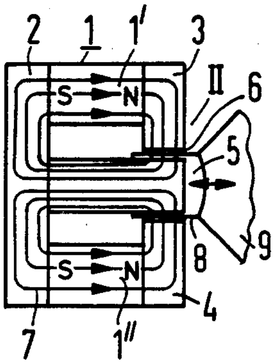
FIG. 1 illustrates the arrangement of a loud speaker with one magneto resistor in the ring-shaped air gap of a magnet.

FIG. 1 shows a section through a magnetic system comprising the tube-shaped, longitudinally magnetized magnet 1, the pole plates 2 and 3 and the core 5. The core 5 has the form of a circular cylinder. The pole plate 3 has an interior hole with a somewhat larger diameter than the core 5. The course of the magnetic field is indicated by field lines 7.

Figure 2:
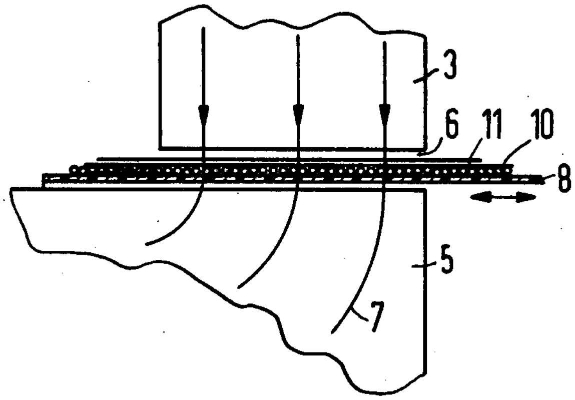
FIG. 2 illustrates a detail II of FIG. 1, namely, specifically the arrangement of the magneto resistor in the air gap.

With respect to FIG. 2, the support 8 of a loud speaker 9 having a coil 10 is positioned in the air gap 6. A magneto resistor 11 is positioned above the coil 10.

The magneto resistor is mechanically connected to the coil 10 so that it can be moved in the air gap 6 together with said coil. The deeper the magneto resistor 11 is immersed into the air gap 6, the larger its resistance value becomes.

The interrelationship between displacement and resistance increase is linear in the preferred embodiment but the concept and apparatus are not limited to a linear relationship.

Figure 3:
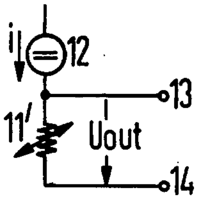
FIG. 3 illustrates a basic electric circuit using magneto resistors.

FIG. 3 illustrates the wiring diagram for a magneto resistor 11'. The magnetor resistor 11' is supplied by a current source 12. The resistance value of the magneto resistor 11' is determined from the voltage $U_{out}$ abutting the terminals 13 and 14 at the two ends of the magneto resistor 11'.

Figure 4:
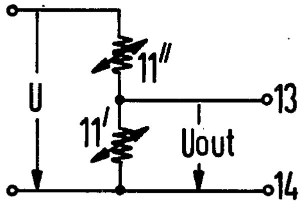
FIG. 4 illustrates the use of two magneto resistors.

If the temperature dependency of the resistance value of the magneto resistor is undesirable, two magneto resistors 11' and 11'' can be provided as in FIG. 4 such that one magneto resistor is inserted into the air gap 6 when the coil 10 is moved, and the other magneto resistor emerges from the air gap 6 and thus the resistance values alter opposingly. If the magneto resistors 11' and 11'' are connected in series as potentiometer, the output voltage $U_{out}$ across terminals 13 and 14 indicates with great precision the momentary position of coil 10.

Whereas a dc or ac voltage U can drive the magneto resistors 11' and 11'' in the sample embodiment of FIG. 4, the source 12 in the sample embodiment of FIG. 3 should be a fixed current source.

Figure 5:
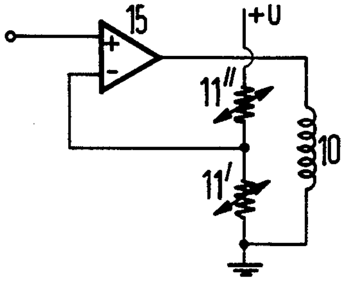
FIGS. 5 and 6 show circuit diagrams of sample magneto resistors in which closed loop position feedback systems incorporate the magneto resistors as feedback elements.
Figure 6:
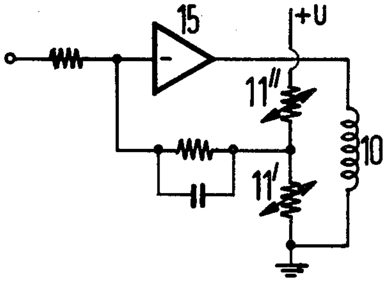

The output signal of the magneto resistor, corresponding with the position of coil 10, can be directly utilized as the feedback signal to an operational amplifier 15 in a circuit in accordance with FIG. 5 or FIG. 6. The precision of the positioning is then determined alone by the precision of the resistance/magnetic field characteristic of the magneto resistors.

FIG. 5 illustrates a position control system for control of the position of the drive coil 10 as a function of an applied input signal which is applied to the positive input of an operational amplifier 15. A first and a second magneto resistor, 11' and 11'' each having a first and a second end are connected together in series. The two resistors 11' and 11'' are mounted in spaced relation on the coil 10 which is located for moving in the air gap in a direction which is essentially perpendicular to the magnetic field 7. As in FIG. 4 the two resistors 11' and 11'' are mounted such when the coil 10 moves in a first direction one of the two resistors 11' and 11'' moves further into the magnetic field and the other of the two resistors moves further out from the magnetic field thereby offsetting any temperature dependency of the resistance values. Similarly when the coil moves opposite to the first direction the two resistors 11' and 11" move in precisely the opposite direction with the coil 10. The operational amplifier 15 has a first and a second input and an output. The output is connected to one end of the drive coil 10. A first end of resistor 11" is connected to a potential source +U and a second end of resistor 11" is connected to a first end of resistor 11'. A second input to operational amplifier 15, the negative or the feedback input, is connected to the junction of the two resistors 11' and 11". The other end of the resistor 11' is connected to the second terminal of the coil 10 both of which are then connected to the common electrical ground of the system.

FIG. 6 shows a second embodiment of a closed loop position control system realized with a pair of magneto resistors 11' and 11" wherein the operational amplifier 15 has only a single input and it is preceded by a summing point whereat an input signal is summed with a feedback signal taken from the common connection between the resistor 11' and 11".

In both FIGS. 5 and 6 the effect of the electrical control system is to detect a difference between the applied input signal indicating desired position and a feedback signal taken from the connection from the two resistors 11' and 11" indicating actual position, amplify the resulting error signal and apply that amplified signal to the coil 10 causing the coil 10 to move in such direction so as to minimize the difference between the input signal and the feedback signal.

While various changes, modifications or equivalent structures might be proposed by those skilled in the art it should be understood that I wish to embody within the claims of the patent warranted hereon all such modifications, changes or equivalent structures as reasonably come within my contribution to the art.

I claim as my invention:

1. A position control system for control of electrodynamic drives having an air gap penetrated by a magnetic field and a drive coil located for movement in that air gap in a first direction essentially perpendicular to the magnetic field and in a direction opposite that first direction, the drive coil having a first and a second terminal, comprising:

a first and a second resistor each mechanically affixed in spaced relation to the drive coil such that as the drive coil moves in the first direction and opposite to the first direction each said resistor moves substantially perpendicular to the magnetic field in said first direction or in said opposite direction, and said spaced relation being such that as the coil and said resistors move in said first direction, said first reactor moves out of the magnetic field simultaneously as said second resistor moves into the magnetic field and such that as the coil and said resistors move opposite said first direction said first resistor moves into the magnetic field simultaneously as said second resistor moves out of the magnetic field;

each said resistor having a first and a second terminal with the resistive characteristic measurable between said first and second terminals of each said resistor being a known function of the position of each said resistor with respect to the magnetic field in the air gap;

means for electrical control including an operational amplifier having a first and a second input terminal and an output terminal with said first terminal being a signal input terminal and with said second terminal being a feedback terminal;

said output terminal of said operational amplifier being connected to the first terminal of the drive coil, said first terminal of said first resistor being connected to a voltage input terminal, said second terminal of said first resistor being connected to said first terminal of said second resistor, said second terminal of said second resistor being operatively connected to the second terminal of the drive coil and to a ground point of said means for electrical contrl with said second terminal of said operational amplifier being operatively connected to said junction of said second terminal of said first resistor and said first terminal of said second resistor;

whereby said electrical control means is operable so that any difference between the signals applied to said first and said second terminals of said operational amplifier is amplified and applied to the drive coil causing it to move so as to minimize the aforesaid difference between the signals. control

2. A position control system for control of electrodynamic drives having an air gap penetrated by a magnetic field and a drive coil located for movement in that air gap in a first direction essentially perpendicular to the magnetic field and in a direction opposite the first direction, the drive coil having a first and a second terminal, comprising:

a first and a second resistor each mechanically affixed in spaced relation to the drive coil such that as the drive coil moves in the first direction and opposite to the first direction each said resistor moves substantially perpendicular to the magnetic field in said first direction or in said opposite direction, and said spaced relation being such that as the coil and said resistors move in said first direction, said first resistor moves out of the magnetic field simultaneously as said second resistor moves into the magnetic field and such that as the coil and said resistors move opposite said first direction and first resistor moves into the magnetic field simultaneously as said second resistor moves out of the magnetic field;

each said resistor having a first and a second terminal with the resistive characteristic measurable between said first and second terminals of each said resistor being a known function of the position of each said resistor with respect to the magnetic field in the air gap;

means for electrical control including a means for summing and an operational amplifier, said means for summing having a first and a second input and an output, said amplifier having an input terminal and an output terminal, said output of said means for summing being operatively connected to said amplifier input and with said output of said amplifier being connected to one terminal of the coil;

said first and second resistors being connected in series between a voltage terminal and the second terminal of the drive coil with a connection point between said two resistors being operatively connected to said first input to said means for summing; whereby an input signal applied to said second input of said means for summing is compared to a signal applied to said first input of said means for summing and a difference signal is operatively applied to the coil causing it to move so as to minimize that difference.

3. An improved magneto resistant feedback means for use in a position control system for control of electrodynamic drives having an air gap penetrated by magnetic field having a drive coil located for movement in that air gap in a first direction essentially perpendicular to the magnetic field and in a direction opposite to that first direction, a means for electrical control including an operational amplifier having a first and a second input terminal and an output terminal with said first terminal being a signal input terminal and with a second terminal being a feedback terminal, the drive coil having a first and a second terminal, the output terminal of the operational amplifier being connected to a first terminal of the drive coil, the improved feedback means comprising:

a first and a second resistor each mechanically affixed in spaced relation to the drive coil such that as the drive coil moves in the first direction and opposite to the first direction each said resistor moves substantially perpendicular to the magnetic field in said first direction or in said opposite direction; said spaced relation being such that if the coil and said resistors move in said first direction, said first resistor moves out of the magnetic field simultaneously as said second resistor moves into the magnetic field and such that as the coil and said resistors move opposite said first direction, said first resistor moves into the magnetic field simultaneously as said second resistor moves out of the magnetic field;

each said resistor having a first and a second terminal with the resistance characteristic measurable between said first and second terminals of each said resistor being a known function of the position of each said resistor with respect to the magnetic field in the air gap;

said first terminal of said first resistor being connected to a potential supply terminal, said second terminal of said first resistor being connected to said first terminal of said second resistor, said second terminal of said second resistor being operatively connected to the second terminal of the drive coil and to a ground point of the means for electrical control with said second terminal of the operational amplifier being operatively connected to said junction of said first terminal of said first resistor and said first terminal of said second resistor;

whereby said control means is operable so that any difference between the signal supplied to the first terminal, and to the second terminal of the operational amplifier is operatively applied to the drive coil causing it to move so as to minimize the aforesaid difference between the signals.

* * * * *